United States Patent Office 3,164,479
Patented Jan. 5, 1965

3,164,479
MANUFACTURE OF MEAT-CURING SALT
COMPOSITION
Louis Sair, Evergreen Park, and Carroll L. Griffith, Chicago, Ill., assignors to The Griffith Laboratories, Inc., Chicago, Ill., a corporation of Illinois
No Drawing. Filed Feb. 12, 1964, Ser. No. 342,839
4 Claims. (Cl. 99—222)

The present application is a continuation-in-part of Serial No. 154,363, filed November 22, 1961, now abandoned.

The present invention relates generally to curing salts, and in particular, to a free-flowing mass comprising fragments of caked material. Each fragment is an agglomerated particle or aggregate of small crystals, the mass having a particle-size distribution such that the various size-fractions have substantially the same proportional content of curing salt selected from the group consisting of alkali-metal nitrite, alkali-metal nitrate, and mixtures thereof.

The invention involves the mechanical compaction to bonded caked form of a uniform granular mixture comprising essentially the said salts, and especially one in which the selected salt is contained as a heart-like center in a crystal of sodium chloride.

Such curing salt containing heart-like centers and its production are described in U.S. Patents Nos. 2,054,624, 2,054,626, 2,145,417, 2,668,770, 2,668,771, 2,770,548, 2,770,549, 2,770,550 and 2,770,551.

In particular, said Patent No. 2,054,624 discloses that when the salt mixture to be flash-dried contains at least about 80% of sodium chloride and not over about 20% of curing salt selected from the group consisting of alkali-metal nitrite, alkali-metal nitrate, and mixtures thereof, all of the nitrogen-curing salt content is housed in salt crystals, and when a less amount of sodium chloride is present, an excess of the nitrogen-curing salt resides outside of the salt crystals.

Prior to the advent of such crystals, the meat-packing industry used a mechanical mixture of the separate salts, which was provided in bulk in drums. Many complaints by government control authorities arose as a result of using such a mixture. The content of the nitrite salt used in curing is limited by such authorities. It was ascertained that in shipping and in distributing such bulk quantities of the mechanical mixture, gravitational separation frequently took place with the result that there were formed portions relatively deficient and relatively richer in nitrite salt. Use of the richer portions resulted in excess use of nitrite in the curing process. The defect of such mechanical mixtures was overcome by amalgamating the sodium chloride, sodium nitrate and sodium nitrite into integral individual crystals, as explained in said patents.

Said patents describe flash-drying of a sodium chloride solution containing amounts of said selected nitrogen-containing salts which can be housed as heart-like centers within flash-dried sodium chloride crystals. The preferred method for flash-drying is to apply a film of the solution to a heated revolving drum on which the water is evaporated, and from which may be scraped a mass containing individual fine crystals of sodium chloride containing the nitrite salt or nitrate salt, or both, as heart-like centers.

Heretofore, in commercially producing such salt, the crystals are sufficiently dried on the rolls to about 0.5% moisture content by weight. When packed in drums for commercial sale, the crystals as formed frequently cake to a hard mass as results of a residual moisture content and of the fineness of the crystals. Numerous additives to the solution to be dried are effective to minimize the tendency to cake and to prolong the period before any caking takes place. However, such practices are not entirely effective to assure long-time storage of a free-flowing mass of such flash-dried crystals.

The present invention overcomes the tendency of fine-grained salt compositions to cake and provides a long-stable free-flowing curing salt of the kind described without need for additives to minimize caking, as described.

It is the general object of the invention to provide a physically stable granular mass of a curing salt composition free from a tendency to cake, characterized by size-fractions all of which contain substantially the same proportional content of the essential curing salt and in particular the nitrite salt.

It is a particular object of the invention to produce a stable free-flowing crystalline mass of such a curing salt composition which mass consists of particles substantially all of which have the same composition as the original individual flash-dried crystals.

It is a particular object of the present invention to effect caking of an original fine-grained mass of uniform composition, and then comminuting a substantially dry caked mass to a controlled extent for forming crystalline aggregates having substantially the same composition as the original granular mass.

The invention is first illustrated and explained by reference to the use of such flash-dried crystals as the original granular mass to be caked and then fragmented to free-flowing granular form with retention of the desired uniformity of composition.

It is generally known that fine crystals of a salt which has a tendency to cake does cake to a very hard mass, that is, one much harder than when coarser crystals of the same kind will cake. For this reason, for example, coarser crystals of sodium chloride are shipped in bulk carloads, and fine flake sodium chloride is shipped in 100-pound bags. The original flash-dried crystals above described as produced on rolls are very fine, and are subject to caking eventually to a hard mass.

For example, original flash-dried crystals of 90 parts of sodium chloride, 4 parts of sodium nitrate, and 6 parts of sodium nitrite having a moisture content of about 0.5% by weight, have a typical particle-size distribution on U.S. Bureau of Standards screens as follows:

| | Percent |
|---|---|
| On 100 mesh | 2 |
| On 200 mesh | 47 |
| Thru 200 mesh | 51 |

A 200-mesh screen is one having 200 openings of 70 microns diameter per linear inch.

To achieve the desired results the original cyrstals with a moisture content more or less than said 0.5% are purposely caked or agglomerated, thus to eliminate the small-sized crystals from the mass. Then the agglomerated material is ground or comminuted so as to avoid again attaining the original particle-size distribution. Comminution is best done and controlled by passing the cake through the nip of compression rolls set apart to control the size. Several passes are preferred, as by passing the material through a bank of such set rolls, for example, three in number, each following set being more closely spaced. In so comminuting caked material, it has been found that mechanical difficulty is encountered when the moisture content by weight is in the range from 1.0 to 1.5% when certain types of apparatus are employed, and generally encountered in any event when the moisture content is over 1.5% by weight.

To insure a particle-size distribution coarser than that of the original flash-dried crystals, the objective is to produce a product substantially free from particles passing through a 200-mesh screen, up to about 10% being tolerated.

Caking may be effected in one way by mechanically squeezing the fine flash-dried crystals together. This may be done by mechanically compressing the individual original crystals into sheet, cake, or pellet form.

One way is to extrude a rod-like form and to chop off pellets as extruded. Another way is to pass a mass of the oriignal crystals through the nip of heavy compression rolls, exerting very high pressures, so that a sheet may be formed of thickness, for example 11/16 to 1/8-inch. Such sheet may be broken up to lumps as the agglomerates to be comminuted as described.

In caking by mechanical compression it has been found that the original crystals may be removed from the flash-drying rolls with a moisture content up to, but not over, 6% by weight. Higher content of moisture selectively dissolves nitrate and nitrite salts, which are much more soluble than sodium chloride, with the result that the original uniform distribution of the three salts is lost and the comminuted product consists of particles of different compositions, especially in nitrite content.

When the material so caked by mechanical pressure has more than 1.5% moisture content, it must be dried to at least 1.5% moisture content by weight, preferably to well below 1% and practically to zero percent. The drier the material when comminuted, the harder are the agglomerates to be comminuted, which hardness enhances the free-flowing quality.

The equipment for mechanical caking is heavy and costly. However, the agglomeration may be effected otherwise than by mechanical caking. When the original individual crystals contain sufficient moisture not over 6% by weight, subject to reduction by partial or complete drying, a mass of the original moist crystals in mutual contact is so dried or dewatered. The moisture content provides very thin films of saturated sodium chloride solution on crystal surfaces, which when partially dewatered deposits salt to bind and agglomerate the original crystals. The higher the moisture content and the greater the extent of dewatering, the more effective is the agglomeration.

For this reason, water may be added to original crystals to elevate the moisture content to or toward said 6% by weight, or alternatively the crystals may be taken from the rolls with a moisture content upwardly from the conventional 0.5%, but not over said 6% by weight.

In practice where the flash-drying is continuous the removed crystals in a mass may be conveyed in mutual contact through a drier, such as an inclined rotating drum, to the moisture content and thereby deposit salt as a binder. Because a limited moisture content is permitted for comminution, such conveying and drying is preferably carried out to lower the moisture content to zero. Then, the resulting agglomerates are comminuted.

The following examples exemplify operations within and outside the scope of the invention.

In the following examples, the solution to be flash-dried has a composition long established in commercial practice as follows:

|  | Parts by weight |
|---|---|
| Sodium chloride | 90 |
| Sodium nitrate | 4 |
| Sodium nitrite | 6 |

However, the invention is not limited to such composition as is explained in the said patents pertaining to flash-drying. Moisture content given in the examples is in percentage by weight.

EXAMPLE 1

Flash-dried crystals are removed from the rolls at 3% moisture content. The original crystals are conveyed en masse through a drum drier and dried to 0.2% moisture content, thus effecting agglomeration. The resulting agglomerates as comminuted have a particle-size distribution and nitrite content as follows:

| Mesh | Percent | Percent NaNO$_2$ |
|---|---|---|
| On 100 | 60 | 6.04 |
| On 200 | 38 | 6.02 |
| Thru 200 | 2 | 6.10 |

The product is free-flowing, uniform in composition, of larger sizes than the original fine crystals, and is substantially free from particles passing through a 200-mesh screen.

EXAMPLE 2

Flash-dried crystals are removed wet from the rolls and blended to a moisture content of 6%, then agglomerated and dried as in Example 1 to 0.2% moisture content. The agglomerates are comminuted to a product as follows:

| Mesh | Percent | Percent NaNO$_2$ |
|---|---|---|
| On 100 | 65 | 6.01 |
| On 200 | 33 | 6.07 |
| Thru 200 | 2 | 6.03 |

EXAMPLE 3

The crystals are removed from the rolls at 3% moisture content and then water is uniformly mixed in to attain 7.5% moisture content. Agglomerated and dried to 0.2% moisture content, the product as comminuted is as follows:

| Mesh | Percent | Percent NaNO$_2$ |
|---|---|---|
| On 100 | 79 | 6.3 |
| On 200 | 21 | 4.8 |
| Thru 200 | 0 |  |

The excess of water has destroyed the uniform distribution of nitrite salt in the particles, such that the differential in weight leads to settling and non-uniformity under the conditions explained above.

EXAMPLE 4

Crystals are removed from the flash-drying rolls at 3% moisture content and pelletized by conventional equipment, for example, to pellets about 1/4-inch in length and about 3/16-inch in diameter. These are dried to 0.1% moisture content, and then comminuted to a product as follows:

| Mesh | Percent | Percent NaNO$_2$ |
|---|---|---|
| On 100 | 62 | 6.06 |
| On 200 | 34 | 6.10 |
| Thru 200 | 5 | 6.03 |

The foregoing product is of acceptable uniformity.

EXAMPLE 5

Crystals removed from the rolls at 3% moisture content are elevated to 8% moisture content by addition of water. Then the mass is pelletized as in Example 4. The pellets are dried to 0.3% moisture content and comminuted to a non-uniform product as follows:

| Mesh | Percent | Percent NaNO$_2$ |
|---|---|---|
| On 100 | 70 | 6.2 |
| On 200 | 27 | 4.6 |
| Thru 200 | 3 | 4.0 |

The excess water renders the size-fractions variable in content of nitrite salt, as in Example 3.

EXAMPLE 6

Crystals are removed from the rolls at 1.5% moisture content. A mass thereof is forced through caking compression rolls exerting a force of 60,000 pounds per linear inch of roll, forming a cake ⅛-inch thick.

The cake is broken into lumps and dried to 0.1% moisture content and comminuted to a uniform product as follows:

| Mesh | Percent | Percent NaNO$_2$ |
|---|---|---|
| On 100 | 65 | 6.03 |
| On 200 | 33 | 6.05 |
| Thru 200 | 2 | 6.02 |

The non-caking characteristic of the product has been demonstrated by shipping the same in drums around the country for three months, and at the same time, similarly shipping the prior commercial form as controls. The drums used were 7-ply fiber drums with lacquered metal lids and bottoms.

At the end of three months the controls were caked in the bottoms of the drums. A new form which was agglomerated at 2% moisture content, dried to 0.1% moisture content, and comminuted to a size all passing a 30-mesh screen and remaining on a 100-mesh screen, remained free-flowing throughout the drums.

The invention in its broadest aspect consists of bonding an original fine-grained granular mass of substantially uniform composition to a coarser-grained granular mass of aggregated crystals having size-fractions of substantially uniform content of the essential curing salt component. The invention in its specific aspect consists of converting a mass of the fine-grained original individual flash-dried crystals to a mass of coarser-grained crystalline particles having a uniform composition which is the same as the uniform composition of the original crystals.

This is best accomplished by agglomerating the original crystals into coarser-sized particles or masses larger than are eventually contemplated and then reducing the agglomerates to sizes having a particle-size distribution larger than that of said original crystals. The means and method for such agglomeration for comminution may be varied as set forth above.

The broadest aspect of the invention is illustrated by reference to the copending application Serial No. 344,464, filed February 19, 1964, as a continuation-in-part of Serial No. 209,216, filed July 11, 1962, now abandoned, by the applicant Sair hereof with another. In said application an original granular mass of substantially uniform composition, which mass is a fine-grained mixture of sodium chloride crystals and of alkali-metal nitrite, and alkali-metal nitrate, with and without a small amount of water, is bonded to caked form by application of effective mechanical pressure. Then, the caked forms which are substantially dry are fractured or comminuted to provide a granular mass characterized by size-fractions having substantially the same content of said nitrite salt as the original granular mass.

EXAMPLES 7 TO 10

A composition by weight of 90 parts of sodium chloride crystals, 6 parts of sodium nitrite crystals and 4 parts of sodium nitrate crystals was ground fine, presenting a screen analysis as follows:

Table I

| Fraction | Fine Mixture | |
|---|---|---|
| | Percent of whole | Percent Nitrite |
| On 150 Mesh | 1 | 5.85 |
| On 200 Mesh | 10 | 6.65 |
| On 270 Mesh | 22 | 6.15 |
| Thru 270 Mesh | 66 | 6.05 |

Portions of the fine-grained mass with and without added water were compacted between rolls by a force of 5,400 pounds per linear inch of roll, and then the resulting caked forms having not more than 1% of moisture were reduced in size and the resulting mass subjected to screen analysis and to determination of the nitrite content in the fractions so obtained.

Table II shows the percent of water added to the original mass for compaction, the mesh screens used, the screen analysis, and the nitrite content in percent in each screen fraction.

Table II

| Example No. | Percent H$_2$O | | On 50 | On 100 | On 200 | Thru 200 |
|---|---|---|---|---|---|---|
| 7 | 0 | Percent Content | 54 | 28 | 5 | 13 |
| | | Percent Nitrite | 6.10 | 5.99 | 6.05 | 6.05 |
| 8 | 1 | Percent Content | 61 | 24 | 4 | 10 |
| | | Percent Nitrite | 6.05 | 6.06 | 5.95 | 5.95 |
| 9 | 2 | Percent Content | 55 | 24 | 7 | 14 |
| | | Percent Nitrite | 6.06 | 5.98 | 6.05 | 6.05 |
| 10 | 4 | Percent Content | 57 | 23 | 7 | 13 |
| | | Percent Nitrite | 6.03 | 5.99 | 6.04 | 6.02 |

The mesh data of Table I is typical of a fine-grind which will cake on standing, while the mesh data of Table II shows a particle-size distribution of sufficient coarseness so that the composition is free-flowing indefinitely. The coarser the ground caked forms, the closer its size fractions are to the composition of the original mixture.

It is understood that the salt composition which is the subject of the present invention may contain additives, such as those disclosed in the above-listed patents, for various purposes, including for example those additives which are disclosed for minimizing the tendency to cake, and including sugar such as cane or corn sugar.

The invention is not limited to or by the details and examples given above to illustrate and explain the invention, and numerous changes and modifications are contemplated as falling within the scope of the invention as expressed in the appended claims.

The product of the present application is claimed in Serial No. 406,978, filed October 28, 1964, as a continuation-in-part of the present application.

We claim:

1. The method of producing a curing salt composition which comprises flash-drying a solution containing solute consisting essentially of sodium chloride and curing salt and containing by weight per 100 parts of dissolved salt at least about 80 parts of sodium chloride and not over about 20 parts of curing salt selected from the group consisting of alkali-metal nitrite, alkali-metal nitrate and mixtures thereof, so that there is formed a mass of original fine-grained individual crystals of sodium chloride housing said selected salt as heart-like centers, the mass of said crystals containing water in amount not more than 6% by weight, the sodium chloride being present in amount not over that to be used with the curing salt content, bonding masses of said individual crystals into caked forms by application of effective mechanical pressure, and reducing the size of the caked forms in substantially dry form to a free-flowing non-caking granular mass of particles, which are compaction-bonded agglomerates of said flash-dried crystals.

2. The method of claim 1 in which the substantially dry caked forms have not more than 1.5% of water by weight.

3. The method of claim 1 in which the substantially dry caked forms have well below 1% of water by weight.

4. The method of producing a curing salt composition, which comprises bonding to caked forms by application of effective mechanical pressure a fine-grained particulate mass of substantially uniform composition consisting essentially of a major portion of sodium chloride crystals and a minor portion of salt selected from the group consisting of alkali-metal nitrite, alkali-metal nitrate, and mixtures thereof, which mass has not more than 6% by weight of water, the sodium chloride being present in amount not over that to be used with the curing salt content, and reducing the size of said caked forms which are substantially dry and contain not more than 1.5% of water to provide a free-flowing granular mass of compaction-bonded agglomerates of such particle-size-distribution that all the size fractions thereof have a substantially uniform composition.

References Cited by the Examiner
UNITED STATES PATENTS

| | | | |
|---|---|---|---|
| 2,054,624 | 9/36 | Griffith | 99—159 X |
| 2,054,625 | 9/36 | Griffith | 99—159 X |
| 2,054,626 | 9/36 | Griffith | 99—159 |
| 2,145,417 | 1/39 | Hall | 99—222 |
| 2,400,292 | 5/46 | Dalton | 99—141 |
| 2,668,770 | 2/54 | Hall | 99—159 X |
| 2,668,771 | 2/54 | Hall | 99—159 X |
| 2,770,548 | 11/56 | Hall et al. | 99—159 X |
| 2,770,549 | 11/56 | Hall | 99—159 X |
| 2,770,550 | 11/56 | Hall et al. | 99—159 X |
| 2,770,551 | 11/56 | Hall et al. | 99—159 X |
| 2,828,212 | 3/58 | Sair | 99—159 X |
| 2,935,387 | 5/60 | Phillips | 71—64 X |
| 2,977,214 | 3/61 | McLellan | 71—64 |
| 3,098,767 | 7/63 | Bush | 127—63 |

A. LOUIS MONACELL, *Primary Examiner.*

HYMAN LORD, *Examiner.*